United States Patent
Sumner

[11] 3,799,107
[45] Mar. 26, 1974

[54] POSITIVE FLUID FLOW INDICATOR

[76] Inventor: Orbie L. Sumner, RFD No. 1, Cleveland, Okla. 74020

[22] Filed: June 11, 1973

[21] Appl. No.: 368,884

[52] U.S. Cl............. 116/70, 73/419, 116/117, 137/557, 340/213.1
[51] Int. Cl. ............................ G01l 19/12
[58] Field of Search ....... 116/65, 70, 117; 137/557; 73/419; 340/213.1

[56] References Cited
UNITED STATES PATENTS

| | | | |
|---|---|---|---|
| 3,366,758 | 1/1968 | Bentzen et al. | 116/70 X |
| 3,474,906 | 10/1969 | Tennis | 116/70 X |
| 3,594,745 | 7/1971 | Nickels | 116/70 X |

*Primary Examiner*—Louis J. Capozi
*Attorney, Agent, or Firm*—Head & Johnson

[57] ABSTRACT

This disclosure describes a differential pressure valve for indicating fluid flow between an inlet port, supplied with fluid from a source, to an outlet port which connects with fluid accessories, which utilize the fluid from the source. It comprises a block of suitable material with a central cylindrical bore. Two annular bushings are sealed into the block, defining a cylindrical cavity therebetween. The inlet port is connected through a large orifice to the central cavity at one end. The outlet port is connected to the central cavity through two or more orifices of smaller, selected sizes at the other end. There is a free or floating piston which is sealably movable in the central cavity. In one position the free piston is interposed between the inlet orifice and both of the outlet orifices. The floating piston is adapted, by differential pressure below and above its seal in the central cavity, to move upwardly under the effect of the differential pressure, until it uncovers the smallest of the plural orifices leading from the central cavity to the outlet. If the rate of fluid flow out of the outlet is small then the pressure differential across the floating piston will be reduced to a value which will prevent further movement of the floating piston. However, if the pressure on the outlet is still low, due to large fluid flow out of the outlet, then the differential pressure forces the floating piston still farther until it uncovers the larger orifice, and so on.

4 Claims, 2 Drawing Figures

PATENTED MAR 26 1974  3,799,107

POSITIVE FLUID FLOW INDICATOR

BACKGROUND OF THE INVENTION

This invention is in the field of fluid flow devices. Still more particularly, it is a valve for the purpose of indicating fluid flow through a fluid conduit. Still more particularly, it is a valve which, when manually reset, will indicate fluid flow on the outlet side of the valve and will give positive indication of at least one rate of fluid flow from the outlet.

In the prior art there have been devices for indicating fluid flow through a fluid conduit system. However, none of these are precise enough to indicate small fluid flows corresponding to leaks in the fluid conduit system itself, or in one or more of the appliances connected to the fluid conduit system. The device of this invention is adapted to be sensitive to very small flows. It is also able to indicate and pass large flows, corresponding to the normal use of the fluid conduit system. When the fluid appliances are closed off, and fluid flow should be zero, the device can be manually reset and thereafter will indicate the presence of very small fluid flows out of the conduit system.

SUMMARY OF THE INVENTION

It is a primary object of this invention to provide a differential fluid pressure valve sensitive enough to indicate minute leakage flows of fluid and at the same time to be insensitive to atmospheric pressure and to provide free flow of fluid up to the maximum called for by the conduit system.

These and other objects are realized and the limitations of the prior art are overcome in this invention, by the use of a block of suitable material, with a central cylindrical bore into which is fitted and sealed a floating piston. The ends of the cylindrical bore are closed off, defining a central cavity. Near one end of the block is an inlet fluid supply connection leading into the central cavity through a large orifice. At the other end of the central cavity is an outlet fixture connection which is connected to the central cavity by a plurality of orifices of graded sizes. In one position of the floating piston the piston seal is interposed between the inlet orifice and all of the outlet orifices. If there is pressure maintained in the outlet conduit, there is no tendency for the floating piston to move. If, however, there is a small flow out of the outlet conduit system, the pressure in the outlet conduit will be reduced, and there will be a differential pressure across the floating piston and it will move in the direction of the reduced pressure until it uncovers the first or smallest of the orifices leading from the central cavity to the outlet.

When the piston passes this first orifice, there is then opportunity for a larger fluid flow to pass into the exit conduit. If the leakage flow is small compared to the flow through the smaller of the orifices, then the differential pressure will be reduced, and the floating piston will stay at this intermediate position. However, if there is large fluid flow out of the exit conduit, then there will be a large differential pressure between the central cavity and the exit conduit through a second larger orifice. The piston then will move farther, until the second larger orifice is uncovered. At this time the flow from the inlet into the outlet conduit will be great enough to reduce the differential pressure to a small enough value so that the floating piston will not move any farther.

As the floating piston moves it carries with it two piston rods passing through smaller cylindrical bores of the same diameter in the plugs closing the ends of the central cylindrical cavity. One of the rods extends through to the outside of the housing and indicates the precise position of the floating piston. It is therefore a measure of the fluid flow through the valve. The second piston rod is for the purpose of equalizing the pressure, due to the atmosphere, on the small piston rods so that the movement of the differential floating piston will not be affected by atmospheric pressure.

BRIEF DESCRIPTION OF THE DRAWINGS

These and other objects of this invention and a better understanding of the principles and details of the invention will be evident from the following description taken in conjunction with the appended drawings in which.

DESCRIPTION OF THE PREFERRED EMBODIMENT

Figure 1:
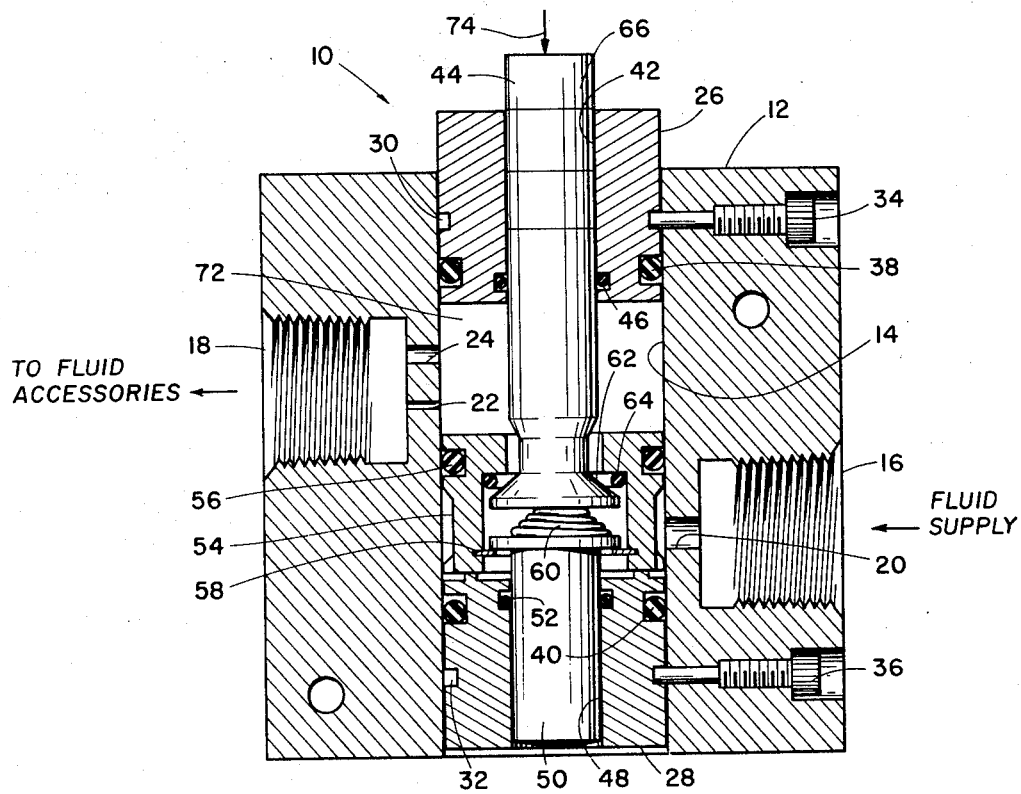
FIG. 1 indicates in cross section the detailed construction of the valve of this invention in the reset position in which it indicates zero leakage flow of fluid.

Referring now to the drawings and in particular to FIG. 1, the differential flow valve of this invention is indicated generally by the numeral 10. It comprises a block of material, such as metal or plastic or other suitable material 12 with a central cylindrical bore 14. There are two annular plugs 26 and 28 inserted into the opposite ends of the central bore 14. These are sealed in position by the seals 38 and 40, respectively, which can be O-ring seals for example. They are also locked in position by means of annular grooves 30 and 32, respectively, and held by locking pins 34 and 36, respectively. In the central cavity 72 there is a floating piston 54 which is sealed by means 56, which can be a O-ring, for example. There is an inlet fixture opening 16 which is connected to the central cavity 72 by means of a large orifice 20. This is positioned at a first end of the central cavity. There is a second fixture 18 for the outlet fluid flow and this is connected to the central cavity by a plurality of orifices, of which two, 22 and 24, are shown; 22 is a small orifice and 24 is a larger orifice. There may be additional orifices if desired. These are positioned axially along the central bore.

In the starting or reset position the floating piston is at the first end of the central cavity 72 and its seal 56 separates the inlet orifice 20 from both of the outlet orifices 22 and 24. Normally, the outlet conduit system connected to fixture 18 will have a pressure equal to the pressure on the inlet fixture 16, as will be explained in the following description. If the pressure in the outlet conduit system connected to 18 is absolutely tight, and there is no leakage of fluid, then the pressure in the orifice 22 will be equal to the pressure in the orifice 20 and there will be no differential pressure across the floating piston 54 to cause it to move. However, if there should be a small fluid flow out of the outlet conduit, then the pressure in the orifice 22 will be reduced below that in the inlet orifice 20. This will represent a pressure differential across the floating piston, between the two portions of the central cavity separated by the seal 56. This will cause the floating piston to move axially along the central cavity until the seal 56 passes the position of the small orifice 22. As soon as this happens, there is opportunity for a larger fluid flow from the inlet orifice 20 directly to the smaller orifice 22, into the outlet conduit system. If this flow is large compared to the leakage flow out of the outlet conduit system, then the pressure will be maintained in the outlet conduit, and will be reflected through the orifice 24 to one side of the floating piston, and, of course, the pressure in the inlet orifice 20 will be on the other side of the piston.

In this condition, where the flow through the orifice 22 is large enough to satisfy the leakage flow out of the outlet conduit system, then the pressure in the outlet will be maintained and there will be no further movement of the floating piston. However, if there is an appliance connected to the outlet conduit system which requires a large flow of fluid, then the fluid flow permitted by the orifice 22 will not be great enough to maintain pressure in the outlet conduit. This will be reflected through the orifice 24 to the face of the differential floating piston 54 and it will continue to move axially until the seal 56 passes the larger orifice 24. When this happens, a much increased flow of fluid will be available to supply the flow out of the exit conduit system and therefore there will be no further tendency of the free piston to move farther.

While there have been only two orifices shown, 22 and 24, of graded, selected sizes there can, of course, be more than two, which then would provide indication of several magnitudes of fluid flow through the device.

The two bushings 26 and 28 have central bores 42 and 48 respectively, both of the same size. These are sealed by rods 44 and 50, respectively, which are sealed into the bushings by means of the seals 46 and 52, respectively. The ends of the two rods 44 and 50 are exposed to the atmosphere. Since they are of equal diameter there is no tendency for atmospheric pressure to change the position of these rods and of the floating piston connected thereto. The lower rod 50 has a flanged top which is locked by means of ring 58 so that it is carried with the floating piston 54.

The rod 44 passes through the floating piston and at its lower end is sealed by means of the conical surface 62 and the seal ring 64. The two rods are forced apart by means of a spring 60 so that the seal surface 62 is always sealed against the seal ring 64, except when a force 74 is applied to the exposed end of the rod 44. This forces the rod 44 downwardly and by means of the spring 60 forces the rod 50, and with it the free piston 54. When the free piston reaches its bottom position, continued pressure of the force 74 compresses the spring 60 and breaks the seal at the seal ring 64, equalizing the pressure on both sides of the floating piston 54. At this position, the pressure in the outlet conduit system through 18 is the same as the pressure on the inlet system through 16. When the force 74 is removed, the spring 60 forces the rod 44 upwardly and seals against the seal ring 64 and the floating piston is now in condition to be moved longitudinally by a differential pressure, caused by a fluid flow through the outlet 18.

Figure 2:
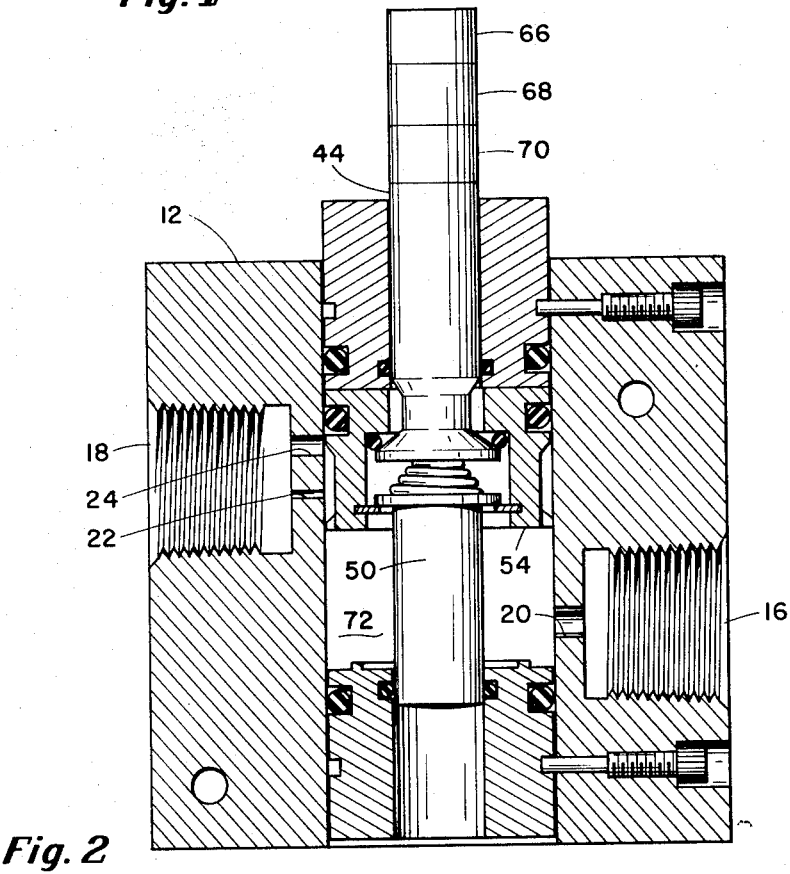
FIG. 2 indicates in cross section a view of the instrument when the floating piston is in the position indicating maximum fluid flow.

FIG. 2 indicates the condition where the floating piston 54 is in its extended position, where it has uncovered both orifices 22 and 24. At this time if the fluid flow out of the outlet conduit system is shut off and if the rod 44 is moved downwardly under the force 74, it will assume the position shown in FIG. 1. The pressure on the two sides of the floating piston will be equalized and until there is further flow out of the outlet conduit system, there will be no movement of the floating piston.

In FIG. 2 there is shown three positions 66, 68 and 70 of the exposed ends of the rod 44. When they are exposed, they will indicate, by the portion 66 that there is no flow through the valve. When portion 68 is exposed it will indicate that there is partial flow through the valve. When the portion 70 is exposed, it will indicate that there is maximum flow through the valve. These various portions 66, 68 and 70 of the rod 44 can be painted in different colors, or marked in other ways, to indicate from a distance what the flow situation is. Also, as is well known in the art, it is possible to provide switches or other means for controlling electrical circuits and signal devices, to indicate the position of the rod 44, and the flow through the valve.

One particular advantage of this differential flow valve is that it is insensitive to atmospheric pressure changes, even though it has a cylindrical rod portion which extends out from the internal cavity of the valve to the atmosphere. The pressure of the atmosphere on the floating piston is balanced by the equal and opposite pressure on the opposite ends of the rods 44 and 50.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. A positive fluid flow indicator valve comprising:
   a. a housing having a central cylindrical bore, and means to close and seal both ends of said bore to form a central cavity;
   b. a floating piston sealed into said central cavity;
   c. inlet orifice means connecting said cylindrical bore at the first end thereof to an inlet conduit;
   d. a plurality of outlet orifice means of selected sizes connecting said cylindrical bore near the second end thereof to an outlet conduit, said plurality of orifices arrayed along said bore;
   e. a first and a second rod carried by said floating piston, said rods of equal area and sealed through said means to close and seal said cylindrical bore, at least a first rod extending through said housing; and
   f. means for equalizing pressure across said floating piston.

2. The valve as in claim 1 in which said inlet orifice is of area at least equal to the sum of the areas of said plurality of outlet orifices.

3. The valve as in claim 1 in which the outlet orifice closest to said inlet orifice is smaller in area than the outlet orifice farther away from said inlet orifice.

4. The valve as in claim 1 in which said means for equalizing pressure comprises seal means between said first rod and said floating piston, said seal means held closed by spring force.

* * * * *